(12) United States Patent
Beisele et al.

(10) Patent No.: US 11,976,157 B2
(45) Date of Patent: May 7, 2024

(54) POLYOL COMPONENT FOR THE PRODUCTION OF PUR FOAMS

(71) Applicant: HUNTSMAN ADVANCED MATERIALS LICENSING (SWITZERLAND) GMBH, Basel (CH)

(72) Inventors: Christian Beisele, Muellheim (DE); Daniel Baer, Riehen (CH); Celine Chatard, Saint Louis (FR)

(73) Assignee: HUNTSMAN ADVANCED MATERIALS (Switz, Basel (CH)

( * ) Notice: Subject to any disclaimer, the term of this patent is extended or adjusted under 35 U.S.C. 154(b) by 0 days.

(21) Appl. No.: 15/557,565

(22) PCT Filed: Feb. 8, 2016

(86) PCT No.: PCT/EP2016/052592
§ 371 (c)(1),
(2) Date: Sep. 12, 2017

(87) PCT Pub. No.: WO2016/142113
PCT Pub. Date: Sep. 15, 2016

(65) Prior Publication Data
US 2018/0051124 A1    Feb. 22, 2018

(30) Foreign Application Priority Data

Mar. 12, 2015 (EP) .................. 15158730

(51) Int. Cl.
| | | |
|---|---|---|
| *C08G 18/69* | (2006.01) | |
| *C08G 18/08* | (2006.01) | |
| *C08G 18/18* | (2006.01) | |
| *C08G 18/20* | (2006.01) | |
| *C08G 18/24* | (2006.01) | |
| *C08G 18/40* | (2006.01) | |
| *C08G 18/42* | (2006.01) | |
| *C08G 18/48* | (2006.01) | |
| *C08G 18/62* | (2006.01) | |
| *C08G 18/76* | (2006.01) | |
| *C08J 9/00* | (2006.01) | |
| *C08J 9/12* | (2006.01) | |
| *C08L 19/00* | (2006.01) | |
| *H01B 3/42* | (2006.01) | |
| *C08K 3/36* | (2006.01) | |

(52) U.S. Cl.
CPC ....... *C08G 18/698* (2013.01); *C08G 18/0871* (2013.01); *C08G 18/088* (2013.01); *C08G 18/14* (2013.01); *C08G 18/18* (2013.01); *C08G 18/2081* (2013.01); *C08G 18/246* (2013.01); *C08G 18/4018* (2013.01); *C08G 18/42* (2013.01); *C08G 18/4233* (2013.01); *C08G 18/4812* (2013.01); *C08G 18/4837* (2013.01); *C08G 18/485* (2013.01); *C08G 18/4883* (2013.01); *C08G 18/4887* (2013.01); *C08G 18/62* (2013.01); *C08G 18/69* (2013.01); *C08G 18/7664* (2013.01); *C08G 18/7671* (2013.01); *C08J 9/0061* (2013.01); *C08J 9/122* (2013.01); *C08L 19/006* (2013.01); *H01B 3/421* (2013.01); *H01B 3/427* (2013.01); *C08G 2110/0008* (2021.01); *C08J 2205/06* (2013.01); *C08J 2375/08* (2013.01); *C08J 2483/12* (2013.01); *C08K 3/36* (2013.01)

(58) Field of Classification Search
CPC .............. C08G 18/698; C08G 18/4883; C08G 18/0871; C08G 18/14; C08G 18/4812; C08G 18/485; C08G 18/4887; C08G 18/246; C08G 18/2081; C08G 18/18; C08G 18/088; C08G 18/7671; C08G 18/7664; C08G 18/4837; C08G 18/4233; C08G 18/4018; C08G 18/62; C08G 18/69; C08G 18/42; C08G 2101/0008; C08G 18/48; H01B 3/421; H01B 3/427; C08J 9/0061; C08J 9/122; C08J 2205/06; C08J 2375/08; C08J 2483/12; C08L 19/006; C08L 2205/03; C08K 3/36

See application file for complete search history.

(56) References Cited

U.S. PATENT DOCUMENTS

| | | | | |
|---|---|---|---|---|
| 4,507,430 A | * | 3/1985 | Shimada | ............ C08G 18/6204 524/591 |
| 4,752,626 A | | 6/1988 | Hoye et al. | |

(Continued)

FOREIGN PATENT DOCUMENTS

| | | |
|---|---|---|
| CA | 2114874 A1 | 8/1994 |
| CA | 2260343 A1 | 8/1999 |

(Continued)

OTHER PUBLICATIONS

Partial Google Patent English translation of International Application No. WO02/074819, publication date Sep. 26, 2002, 1 page.

(Continued)

*Primary Examiner* — James C Yager
(74) *Attorney, Agent, or Firm* — HUNTSMAN ADVANCE; David K. Wooten

(57) ABSTRACT

A composition comprising
(a1) a polyether polyol,
(a2) a polyolefin polyol and
(a3) a polyester polyol obtainable by epoxidation of an unsaturated fatty acid ester and subsequent ring-opening reaction with a compound containing active hydrogen,
can be used for the preparation of PUR foam which distinguishes by low-temperature flexibility and low dielectric loss and is suitable for filling the gap between the condenser core and the outer composite or porcelain insulator in the manufacture of resin impregnated paper (RIP) bushings.

5 Claims, No Drawings

(56) References Cited

U.S. PATENT DOCUMENTS

| | | | |
|---|---|---|---|
| 5,039,755 A | 8/1991 | Chamberlain et al. | |
| 5,237,036 A | 8/1993 | Spitzer | |
| 5,340,900 A | 8/1994 | Spitzer et al. | |
| 5,362,913 A | 11/1994 | Knifton et al. | |
| 5,550,169 A * | 8/1996 | Yata | C08G 18/4063 |
| | | | 521/112 |
| 6,166,098 A * | 12/2000 | Burkhart | C08G 77/46 |
| | | | 521/112 |
| 2004/0077779 A1 * | 4/2004 | Schafheutle | C08G 18/44 |
| | | | 524/589 |
| 2010/0217022 A1 * | 8/2010 | Abraham | C08G 18/36 |
| | | | 554/163 |
| 2012/0116044 A1 | 5/2012 | Kunst et al. | |
| 2013/0068990 A1 | 3/2013 | Eilbracht et al. | |
| 2013/0143977 A1 * | 6/2013 | Villa | C08G 18/3203 |
| | | | 521/174 |

FOREIGN PATENT DOCUMENTS

| | | |
|---|---|---|
| CN | 101987884 A | 3/2011 |
| EP | 0393962 A2 | 10/1990 |
| EP | 0862032 A2 | 9/1998 |
| EP | 0961796 A1 | 12/1999 |
| JP | H06256453 A | 9/1994 |
| JP | 2007197499 A | 10/2012 |
| JP | 2007154134 A | 8/2013 |
| JP | 2010254915 A | 1/2014 |
| JP | 2010095721 A | 7/2014 |
| JP | 2013216750 A | 8/2016 |
| JP | 2015003971 A | 11/2017 |
| JP | 2016108510 A | 1/2019 |
| JP | 2016183249 A | 2/2019 |
| WO | 9833832 A1 | 8/1998 |
| WO | 0056805 A1 | 9/2000 |
| WO | 02074819 A1 | 9/2002 |
| WO | 03029320 A1 | 4/2003 |
| WO | 2013102540 A1 | 7/2013 |
| WO | 2014146888 A1 | 9/2014 |

OTHER PUBLICATIONS

Derosches et al.: "From Vegetable Oils to Polyurethanes: Synthetic Routes to Polyols and Main Industrial Products", Polymer Reviews 52 (1), 38-79 (2012).

International Search Report and the Written Opinion of the International Searching Authority dated Apr. 25, 2016.

Database WPI, Week 201139, XP-002743445, Thomson Scientific, London, GB; AN 2011-E58257.

* cited by examiner

POLYOL COMPONENT FOR THE PRODUCTION OF PUR FOAMS

CROSS-REFERENCE TO RELATED APPLICATIONS

This application is the National Phase of International Application PCT/EP2016/052592 filed Feb. 8, 2016, which designated the U.S. and which claims priority to U.S. application Ser. No. 15/158,730.0 filed Mar. 12, 2015. The noted applications are incorporated herein by reference.

FIELD OF INVENTION

The present invention relates to polyol compositions which in combination with suitable polyisocyanates provide polyurethane (PUR) foams which can advantageously be applied during manufacture of high voltage (HV) resin impregnated paper (RIP) bushings to fill the gap between the condenser core and the outer hollow insulator (composite type or porcelain).

BACKGROUND OF THE INVENTION

RIP condenser cores are manufactured by using crepped paper which is wound continuously while inserting aluminium foils to build up a capacitive grading of the electric field strength. After the winding process the core is impregnated with epoxy resin under vacuum and heat. The solid core is machined afterwards to complete the final size. Typically a RIP bushing has an outer composite or porcelain insulator and the gap between the condenser core the outer composite or porcelain insulator is filled with foam, usually PUR foam.

The requirements to be met by a PUR foam which can expediently be applied as filling material for RIP bushings are versatile.

The foamable compositions usually consist of two constituents, a polyol component and a polyisocyanate component, which are mixed shortly before the application, i.e. shortly before the generation of the PUR foam. Since the polyol component frequently contains several polyols as well as various (dispersed) additives, these mixtures often tend to precipitation of solid components or separation. Therefore, storage stability of the polyol component is an important factor.

Furthermore, the foamable composition should ensure a sufficiently long pot-life to allow the filling of large ultra-high voltage (UV) bushings, i.e. the viscosity of the composition should increase only moderately after mixing of the components. The pot-life is generally specified as time period from merging polyol and isocyanate component including additives until the viscosity adds up to 15 Pa·s and should amount >90 min for the intended use.

In order to withstand large temperature differences, it is necessary that the cured PUR foam exhibits a substantial low-temperature flexibility. Thus, the glass transition temperature $T_g$ should be rather low: $T_g<-50°$ C.

Most important for an insulating material that is used in HV bushings are the dielectric properties. Accordingly, the target for the dielectric loss is tan δ<5% (RT) and tan δ<15% (100° C.), respectively.

U.S. Pat. No. 4,752,626 describes a high resilience urethane foam having low compression set at a wide range of isocyanate index for use in small void filling in integrated foam parts. The small voids formed in the molding process of integrated foam parts can be filled without penetration of foaming liquids into existing foam cells. In addition, resulting foams have very low compression set values at a wide range of isocyanate index. The foaming system according to U.S. Pat. No. 4,752,626 is composed of a thixotropic polyisocyanate component and a thixotropic polyol component which is a blend of a polyolefinic polyol and a polyoxyalkylene polyol in a weight ratio between 95/5 to 50/50. The thixotropy is obtained by adding benzal sorbitol to the respective components. While this PUR foam is well suited for filling small voids formed in the molding process of automotive foam parts, the application in HV capacitors requires more strigent demands with respect to pot-life, low temperature flexibility and electrical performance.

It was an object of the present invention to provide a foamable composition consisting of a storage-stable polyol component and a polyisocyanate component which ensures a sufficiently long pot-life, low temperature flexibility, low dielectric loss and a satisfactory compatibility of components during cure.

It has now been found that these properties can be achieved by use of a specific composition (A) as polyol component comprising
 (a1) a polyether polyol,
 (a2) a hydroxy-terminated polybutadiene or polyisoprene and
 (a3) a polyester polyol obtainable by epoxidation of an unsaturated fatty acid ester and subsequent ring-opening reaction with a compound containing active hydrogen.

Polyether polyols as component (a1) can be obtained, for example, by reaction of a starter with alkylene oxides, for example with ethylene oxide, propylene oxide or butylene oxide or tetrahydrofuran. Starters here are all those usually suitable for the preparation of polyether polyols having a functionality of 2 or 3, for example water, aliphatic, cycloaliphatic or aromatic polyhydroxy compounds having 2 or 3 hydroxy groups, such as ethylene glycol, propylene glycol, butanediols, hexanediols, octanediols, dihydroxy benzenes or bisphenols, for example bisphenol A, trimethylolpropane or amines (see Ullmanns Encyclopädie der Technischen Chemie (Ullmann's Encyclopedia of Industrial Chemistry), $4^{th}$ Edition, Volume 19, Verlag Chemie GmbH, Weinheim 1980, pages 31-38, 304 and 305).

Substances which are particularly suitable as constituent (a1) of the compositions according to the invention are polyether-polyols based on ethylene oxide and polyether-polyols based on propylene oxide, and also corresponding ethylene oxide/propylene oxide copolymers which can be either random or block copolymers. The ratio of ethylene oxide to propylene oxide in these copolymers can vary within wide limits Thus, for example, it is possible for only the terminal hydroxyl of the polyether-polyols to be reacted with ethylene oxide (end masking).

The molecular weight $M_w$ of the polyether-polyols based on polyethylene and/or polypropylene is preferably 100-2000 g/mol, more preferably 200-1000 g/mol and in particular 300-600 g/mol.

Polytetrahydrofurans which, like the polyalkylene glycols already defined above, are likewise commercially available (for example POLYMEG® supplied by LyondellBasell) are also to be noted.

Preferably, a linear or branched polyethylene oxide or polypropylene oxide is applied as component (a1) in the compositions according to the invention.

Hydroxy-terminated ethylene oxide/propylene oxide block copolymers are particularly preferred as component (a1).

Polyolefin polyols according to component (a2) are known and to some extent commercially available. The polymer backbone of a polyolefine polyol is typically the polymerised product of an olefinic monomer or of an olefinic monomer and a vinylaromatic monomer. The olefinic monomer conveniently contains 2 to 12 carbon atoms. Preferably, the olefinic monomer is a diene having 4 to 10 carbon atoms, more preferably 4 to 6 carbon atoms.

The most preferred olefinic monomers are butadiene and isoprene, in particular 1,3-butadiene.

The vinylaromatic monomer that may be copolymerised with the olefinic monomer is preferably a monovinylaromatic monomer like styrene or alkylsubstituted styrene. The polyolefine polyol according to component (a2) may contain up to 50% by weight of polymerised vinylaromatic monomer, for example 0.01 to 20.0% by weight and especially 0 to 5% by weight.

In a preferred embodiment the polyolefine polyol according to component (a2) does not contain any polymerised vinylaromatic monomer.

Suitable polyolefine polyols according to the invention can also be completely or partially hydrogenated polymerised products of an olefinic monomer or of an olefinic monomer and a vinylaromatic monomer. Hydrogenation of the polymers can be processed according to known methods, for example by hydrogenation in the presence of catalysts like Raney-nickel, platinum, palladium or soluble transition metal catalysts and titanium catalysts as described in U.S. Pat. No. 5,039,755.

If the polyolefine polyol is derived from 1,3-butadiene, the polybutadiene preferably consists of at least 15% of 1,2-addition product.

If the polyolefine polyol is derived from isoprene, the polyisoprene preferably consists of at least 80% of 1,4-addition product.

The polyolefine polyol preferably has a molecular weight $M_n$ (number average, measured by gel permeation chromatography GPC) of 500-20000, more preferably 1000-15000 and especially preferably 2000-5000.

The polyolefine polyol preferably exhibits a functionality of 1.5 to 3.0 hydroxy groups per molecule, more preferably 1.8 to 2.6 and in particular 1.9 to 2.5 hydroxy groups per molecule.

The polyolefine polyol is preferably a polydiene diol, especially a poly-1,3-butadiene diol.

Suitable poly-1,3-butadiene diols are the compounds of formula

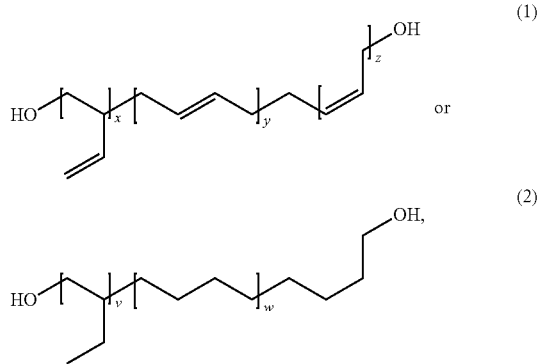

wherein x, y, z, v and w represent the percentages of the structural units and denote the following ranges:

x=10-70%, y=15-70%, z=10-30%, v=10-75%, w=25-90%, with the proviso x+y+z=100% and v+w=100%.

Polyolefine polyols according to formula (1) and (2) are commercially available, for example Poly bd® R45 HTLO (supplied by CRAY VALLEY).

The polyester polyols according to component (a3) of the claimed compositions are likewise known and described, for example, in Polymer Reviews 52 (1), 38-79 (2012). Starting products for the preparation of said polyester polyols are vegetable oils mainly consisting of triglycerides wherein the three hydroxyl groups of glycerol have been esterified with fatty acids. These fatty acids can be saturated, i.e. containing non-reactive aliphatic chains (like stearic acid or palmitic acid), or unsaturated, i.e containing aliphatic chains bearing double bonds (like oleic acid, linoleic acid, linolenic acid or ricinoleic acid). However, it is essential that the triglyceride contains at least two double bonds. Vegetable oils can be epoxidised according to methods known per se, for example by reaction with peracetic acid formed in situ from reaction of acetic acid and hydrogen peroxide. Other suitable methods are the enzymatic epoxidation of vegetable oils or epoxidation by microwaves.

The ring-opening reaction of the epoxide can be carried out with various hydrogen-active compounds Nu-H, wherein Nu denotes hydroxyl, amino, alkylamino, hydroxyalkylamino, dialkylamino, di(hydroxyalkyl)amino, alkoxy, hydroxyalkoxy, alkylthio or alkanoyloxy, in the presence of acidic catalysts like sulphuric acid, p-toluenesulfonic acid, fluoroboric acid, perchloric acid or fluoroantimonic acid.

In this manner, a variety of polyester polyols distinguishing with respect to molecular weight, viscosity and functionality can be prepared.

Preferred polyester polyols exhibit a functionality (number of hydroxyl groups per molecule) of 2-4, in particular 2.5-3.5, a medium hydroxyl value of 100-300, in particular 150-250, a medium hydroxyl equivalent weight of 200-500, in particular 300-400, and a medium viscosity (25° C.) of 100-2500 mPa·s. in particular 200-500 mPa·s.

Polyester polyols of this type are commercially available, for example under the trade name SOVERMOL®, supplied by BASF.

Particularly preferred as component (a3) is SOVERMOL® 1111, a branched polyester polyol having a functionality of 3.0, a medium hydroxyl value of 160, a medium hydroxyl equivalent weight of 350 and a medium viscosity (25° C.) of 500 mPa·s.

The polyol component (A) according to the invention may comprise further customary additives suitable for PUR technology, for example catalysts, surface-active substances, drying agents, fillers, dyes, pigments, flameproofing agents, softening agents, thermal aging stabilisers, thixotropic agents, blowing agents and foam stabilizing agents. like for example silicones and dicarboxylic acids.

Suitable catalysts are, for example, tertiary amines such as N-methyldiethanolamine, triethanolamine, dibenzylmethylamine or diazabicyclooctane or organotin compounds such as dibutyltin laurate.

As flameproofing agents for PUR foams usually phosphorous compounds like tricosyl phosphate or dimethylmethane phosphonate or halogen-containing polyols are applied. Inorganic flame retardants like hydrated aluminium oxide, antimony trioxide and ammonium polyphosphate can be used as well.

Mineral oils can be added as softening agents. Suitable products are, for example, the oils sold under the trade name NYFLEX® (supplied by Nynas).

Suitable thermal aging stabilisers for the polyol component according to the invention are, for example, aliphatic glycidylethers like polypropyleneglcoldigylcidylether.

The preferred thixotropic agent is fused silica, for example the products sold under the trade name AEROSIL® (supplied by Evonik).

The total content of additives in the polyol component according to the invention is advantageously 0-30% by weight, preferably 0-15% by weight, based on the total composition.

In cases of a very low reactivity (gel time>2 h) the addition of a specific foam stabiliser is highly recommended.

Accordingly, a further embodiment of the present invention is a polyol component (A) containing the components (a1), (a2) and (a3) as defined above and additionally (a4) a polysiloxane-polyoxyalkylene block copolymer.

Polysiloxane-polyoxyalkylene block copolymers as stabilising agents for PUR foams are described, for example, in U.S. Pat. No. 6,166,098 and EP-A 936 240, and commercially available, for example under the trade names TEGOSTAB® (supplied by Evonik) and DABCO® (supplied by Air Products).

The stabiliser TEGOSTAB® B 8863 Z is particularly preferred.

The amounts in which the components (a1), (a2) and (a3) and optionally (a4) are used in the polyol component (A) can vary within wide limits.

A composition comprising, based on the weight of the total composition (including additives), (a1) 5-30%, preferably 7-20%, especially 8-15%, by weight of a polyether polyol, (a2) 30-70%, preferably 35-65%, especially 40-60%, by weight of a hydroxy-terminated polybutadiene or polyisoprene and (a3) 10-50%, preferably 12-40%, especially 15-30%, by weight of a polyester polyol obtainable by epoxidation of an unsaturated fatty acid ester and subsequent ring-opening reaction with a compound containing active hydrogen, has proved advantageous.

In producing a PUR foam the polyol component (A) containing the composition comprising components (a1), (a2) and (a3) is reacted with a polyisocyanate. The polyisocyanates that are useful in producing PUR foams in accordance with this invention are also well known in the art and are organic compounds that contain at least two isocyanate groups per molecule. Any such compounds or mixtures thereof can be employed. Isocyanates may be aromatic, cycloaliphatic or aliphatic and may be monomeric or oligomeric compounds.

The invention therefore further relates to a composition containing (A) a composition comprising components (a1), (a2) and (a3) according to claim 1 and (B) a polyisocyanate.

Specific examples for suitable polyisocyanates are dodecane-1,12-diisocyanate, 2-ethyltetramethylene-, 1,4-diisocyanate, 2-methylpentamethylene-1,5-diisocyanate, tetramethylene-1,4-diisocyanate, hexamethylene-1,6-diisocyanate, cyclohexane-1,3-diisocyanate, cyclohexane-1,4-diisocyanate, isophorone diisocyanate, hexahydrotoluene-2,4-diisocyanate, hexahydrotoluene-2,5-diisocyanate, dicyclohexylmethane-2,2'-diisocyanate, dicyclohexylmethane-4,4'-diisocyanate, dicyclohexylmethane-2,4'-diisocyanate, toluene-2,4-diisocyanate, toluene-2,6-diisocyanate, diphenylmethane-2,2'-diisocyanate (2,2'-MDI), diphenylmethane-4,4'-diisocyanate (4,4'-MDI), diphenylmethane-2,4'-diisocyanate (2,4'-MDI) and polyphenylpolymethylene polyisocyanates (crude MDI).

The organic diisocyanates and polyisocyanates can be used individually or in the form of their mixtures.

Commercially available diisocyanates often contain dimeric (uretdiones), trimeric (triazines) and oligomeric compounds. In the compositions according to the invention these mixtures of monomers and oligomers can be employed without separation of byproducts or purification.

Preferably, a diphenylmethane diisocyanate, more preferably diphenylmethane-4,4'-diisocyanate or diphenylmethane-2,4'-diisocyanate, is used for the PUR foam according to the invention.

In a particularly preferred embodiment of the invention a mixture of about 60% 4,4'-methylenediphenyl diisocyanate, about 20%, 2,4'-methylenediphenyl diisocyanate and about 20% polymeric methylenediphenyl diisocyanate is applied as isocyanate component (B).

The PURs prepared from components (A) and (B) according to the instant invention, foamed or not foamed, exhibit outstanding properties and can be used in various applications, preferably as isolating material in electrotechnology.

The invention therefore to the use of a composition containing components (A) and (B) as defined above as encapsulation material for electrical components.

To produce the PUR foams according to the invention, the components (A) and (B) are reacted in such amounts that the equivalence ratio of the NCO groups of component (B) to the sum of the reactive hydrogen atoms of the components (a1), (a2) and (a3) is (0.85-1.75):1, preferably (1.0-1.3):1. If the foams based on isocyanate contain at least some bonded isocyanurate groups, a ratio of said components of (1.5-60):1, preferably (3-8):1 is usually employed.

In general, a blowing agent is provided during the PUR forming reaction. The blowing agent may be air, nitrogen, carbon dioxide or any other inert gas. The blowing agent may also be water, which reacts with isocyanate to generate carbon dioxide in situ, or a fluorinated hydrocarbon such as dichlorodifluoromethane, 1,1-dichloro-1-fluoroethane, 1-chloro-1,1-difluoroethane, 2,2-dichloroethane or the like. Non-fluorinated organic compounds such as pentane and acetone may also be employed as blowing agents. The amount of blowing agent required will vary according to the density of the foam which is desired. Suitable levels of blowing agent are known to the skilled person.

The invention further relates to the use of the PUR foam prepared by the process described above in the manufacture of resin impregnated paper (RIP) bushings for filling the gap between the condenser core and the outer composite or porcelain insulator.

Another potential application area for the PUR foam according to the invention is the thermal isolation of pipes which are exposed to extreme temperatures and pressures, for example the pipes used for the exploitation of oil and gas deposits in the deep sea.

Accordingly, the invention further relates to the use of the PUR foam prepared by the process described above as insulating material for pipes.

Furthermore, the PUR foam prepared by the inventive process can advantageously be applied as filling material in hollow core composite insulators.

Therefore, the use of the PUR foam prepared by the process described above in the manufacture of hollow core composite insulators for filling the space in the hollow core tube is another object of the present invention.

The invention is illustrated by the following non-limiting examples.

EXAMPLES

List of Used Raw Materials

BAYGAL® K 55 (supplied by Bayer):
colourless to yellow-coloured trifunctional polypropylene oxide/polyethylene oxide block copolymer; viscosity: ≈600 mPas; hydroxyl value: 370-400 mg KOH/g.

TEGOSTAB® B 8863 Z (supplied by Evonik):
polyethermodified polysiloxane, recommended as foam stabilizer for PUR foams;

LUPRANOL® 2095 (supplied by BASF):
trifunctional polyetherpolyol with primary hydroxyl end groups; recommended for the production of elastic foam materials; viscosity: ≈850 mPas; hydroxyl value: 35 mg KOH/g (DIN 53 240);

ARALDITE® DY 3601 (supplied by Huntsman):
Polypropyleneglcoldigylcidylether, epoxide number: 2.47-2.60 eq/kg (ISO 3001);

NYFLEX 820 (supplied by Nynas GmbH):
liquid naphthenic hydrocarbons from petroleum, viscosity: 90-110 cSt at 40° C. (ASTM 445);

Poly bd® R45 HTLO (supplied by CRAY VALLEY):
liquid hydroxyl-terminated polybutadiene, viscosity: 5 Pas at 30° C., hydroxyl functionality: 2.5, molecular weight $M_n$: 2800 g/mol, 1,2 vinyl-content: 20%;

SOVERMOL® 1111 (supplied by BASF):
branched polyetherester, viscosity: 300-700 mPas at 25° C. (DIN 53015);

UOP L paste (supplied by UOP)
50% paste of a potassium calcium sodium aluminosilicate of the zeolite A type with an approximate pore size of 3 Å in castor oil;

AEROSIL® 200 (supplied by Evonik)
hydrophilic fumed silica with a specific surface area of 200 m$^2$/g;

SUPRASEC® 2447 (supplied by Huntsman):
isocyanate blend containing about 60% 4,4'-methylene-diphenyl-diisocyanate, about 20%, 2,4'-methylenediphenyl-diisocyanate and about 20% polymeric methylenediphenyldiisocyanate;

Preparation of Component A

Preparation of component A for Examples 1-3 (Ex. 1-Ex. 3) according to the invention and Reference Examples 1-3 (C1-C3):

All components of each formulation according to Table 1 with exception of SUPRASEC® 2447 are put to into a metal can of sufficient size in the given proportion to result in 200 g of polyol mixture. The mixture is then prepared by stirring the components at 23° C. with a propeller stirrer for about 2 minutes, resulting in component A.

Preparation of Component B

As component B for Examples 1-3 (Ex. 1-Ex. 3) according to the invention and Reference Examples 1-3 (C1-C3) 100% SUPRASEC® 2447 of Huntsman is used.

Preparation of the Reactive Mixtures of Component A and B

About 150 g of the component A and the corresponding amount of component B according to Table 1 are put to a metal can and then mixed at ambient temperature with a propeller stirrer for 2 min. 80 g of this reactive mixture is then subsequently used to produce foam and the reset to produce the plates for the tan delta testing as described in the following. The results are summarized in Table 1.

Production of Foam and Foam Stability Judgement:
80 g of polyol/isocyanate mixture are put into a 200 ml cup and then stirred with a small high shear disperser mixer for 30 seconds at 2000 rpm. This shearing with this equipment is sufficient to introduce such amount of air to achieve about 30% volume increase due to foam formation. The generated foam is then cured at 23° C. for 72 hours. The aspect of the cured foam sample is then checked on homogeneity. The requirement to pass this foam stability test is to show no signs of collapse.

Judgement on Storage Stability of the Polyol Mixture:
It is required that the polyol mixture (component A) remains clear with no signs of separation over a period of 1 month at room temperature. A formulation showing incompatibility of components normally displays more than 1 phase after some time.

Viscosity Measurement:
The mixture of component A and B is subjected to Rheomat viscosity meter and the development of viscosity is registered until 15 Pas are reached. The time needed to achieve 15 Pas is recorded. The viscosity is measured according to DIN 53019

Tan δ and $T_g$ Measurement:
The mixture of component A and B is cast (without foaming) into molds and 1 and 2 mm thick plates are produced by curing the mixture for 4 hours at 90° C. The tan δ is then measured on the 2 mm thick plates according to IEC 60250.

The $T_g$ is measured by DMA on the 1 mm thick plate according to IEC 6721-2

The compositions according to Examples 1-3 provide a combination of long pot life, low $T_g$ (good low temperature flexibility), low tan delta (good electrical performance) and high storage stability, whereas the compositions according to Reference Examples 1-3 (C1-C3) do not achieve the targeted low Tg of <−50° C. and the required low tan delta of <5% (RT) and <15% (100° C.).

TABLE 1

| Composition | Ex. 1 | Ex. 2 | Ex. 3 | C1 | C2 | C3 |
|---|---|---|---|---|---|---|
| Component A/ pbw *) | | | | | | |
| BAYGAL ® K 55 | 9.50 | 12.00 | 10.00 | 23.00 | 17.27 | 21.00 |
| Poly bd ® R45 HTLO | 45.70 | 40.10 | 58.00 | | | |
| SOVERMOL ® 1111 | 28.60 | 25.40 | 16.00 | | 15.50 | |
| TEGOSTAB ® B 8863 Z | 3.00 | 3.00 | | | 3.00 | 3.00 |
| LUPRANOL ® 2095 | | | | 70.00 | 55.85 | 62.20 |
| ARALDITE ® DY 3601 | 2.00 | 2.50 | 2.00 | 2.00 | 1.88 | 2.00 |
| NYFLEX 820 | 9.50 | 15.00 | 9.00 | | 4.20 | 9.50 |
| UOP L paste | | | 5.00 | 5.00 | | |
| AEROSIL ® 200 | 1.70 | 2.00 | | | 2.30 | 2.30 |

TABLE 1-continued

| Composition | Ex. 1 | Ex. 2 | Ex. 3 | C1 | C2 | C3 |
|---|---|---|---|---|---|---|
| Component B/ pbw *) | | | | | | |
| SUPRASEC® 2447 | 25.00 | 25.00 | 22.00 | 27.00 | 27.00 | 24.50 |
| Pot Life at 25° C./min | 135 | 200 | 103 | 378 | n.d. | n.d. |
| Storage Stability of A | + | + | n.d. **) | + | − | − |
| $T_g$/° C. (4 h/90° C.) | −67 | n.d. | −65 | −37 | n.d. | n.d. |
| tan δ at 23° C. (50 Hz) | 4.0% | n.d. | 4.5% | 8.0% | n.d. | n.d. |
| tan δ at 100° C. (50 Hz) | 12.3% | n.d. | 7.0% | 387% | n.d. | n.d. |

*) pbw: parts by weight
**) n.d.: not determined

What is claimed is:

1. A composition comprising,
   (a1) a polyether polyol,
   (a2) a polyolefin polyol,
   (a3) a polyester polyol obtained by epoxidation of an unsaturated fatty acid ester and subsequent ring-opening reaction with a compound containing active hydrogen,
   (a4) a polysiloxane-polyoxyalkylene block copolymer
   wherein the polyolefin polyol comprises at least one of the compounds represented by formulas (1) and (2):

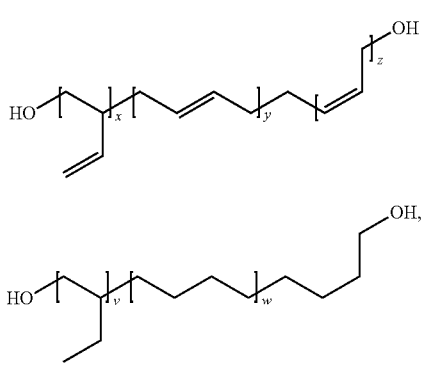

wherein x, y, z, v and w represent the percentages of the structural units and denote the following ranges: x=10 to 70%, y=15 to 70%, z=10 to 30%, v=10-75%, w=25-90%, with the proviso x+y+z=100% and v+w=100%, and
   (B) a polyisocyanate comprising polymeric methylenediphenyldiisocyanate wherein the composition has a pot life of at least 90 minutes.

2. A composition according to claim 1 comprising as component (a1) a linear or branched polyethylene oxide or polypropylene oxide.

3. A composition according to claim 1 comprising as component (a1) a hydroxy-terminated ethylene oxide/propylene oxide block copolymer.

4. A composition according to claim 1 comprising as component (a3) a polyester polyol obtainable from a vegetable oil as unsaturated fatty acid ester.

5. A composition comprising, based on the weight of the composition,
   (a1) 5-30% by weight of a polyether polyol,
   (a2) 35-65% by weight of a polyolefin polyol,
   (a3) 10-50% by weight of a polyester polyol obtained by epoxidation of an unsaturated fatty acid ester and subsequent ring-opening reaction with a compound containing active hydrogen, and
   (a4) a polysiloxane-polyoxyalkylene block copolymer
   wherein the polyolefin polyol comprises at least one of the compounds represented by formulas (1) and (2):

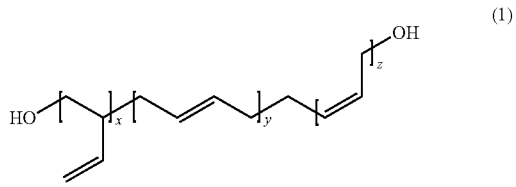

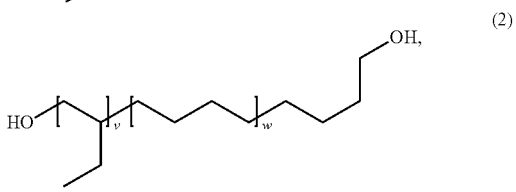

wherein x, y, z, v and w represent the percentages of the structural units and denote the following ranges: x=10 to 70%, y=15 to 70%, z=10 to 30%, v=10-75%, w=25-90%, with the proviso x+y+z=100% and v+w=100% and
   (B) a polyisocyanate comprising polymeric methylenediphenyldiisocyanate wherein the composition has a pot life of at least 90 minutes.

* * * * *